(12) United States Patent
Sato et al.

(10) Patent No.: US 7,326,654 B2
(45) Date of Patent: Feb. 5, 2008

(54) MONODISPERSE NANOPARTICLES PRODUCED BY SIZE-SELECTIVE PHOTOETCHING REACTION

(75) Inventors: Keiichi Sato, Tokyo (JP); Susumu Kuwabata, Osaka (JP); Tsukasa Torimoto, Sapporo (JP)

(73) Assignee: Hitachi Software Engineering Co., Ltd., Tokyo (JP)

( * ) Notice: Subject to any disclaimer, the term of this patent is extended or adjusted under 35 U.S.C. 154(b) by 21 days.

(21) Appl. No.: 10/853,279

(22) Filed: May 26, 2004

(65) Prior Publication Data

US 2007/0065665 A1    Mar. 22, 2007

(30) Foreign Application Priority Data

May 30, 2003 (JP) ............................ 2003-154977

(51) Int. Cl.
*H01L 21/306* (2006.01)
(52) U.S. Cl. ........................................ 438/745; 977/895
(58) Field of Classification Search ................ 205/640, 205/645; 438/5, 745; 977/895
See application file for complete search history.

(56) References Cited

U.S. PATENT DOCUMENTS

| | | | | |
|---|---|---|---|---|
| 3,158,517 A | * | 11/1964 | Schwarzenberger | ......... 438/752 |
| 3,772,105 A | * | 11/1973 | Shipley | ........................ 216/93 |
| 4,026,741 A | * | 5/1977 | Chang et al. | ................ 438/703 |
| 4,351,706 A | * | 9/1982 | Chappell et al. | ............. 205/655 |
| 4,414,066 A | * | 11/1983 | Forrest et al. | .............. 205/655 |
| 4,482,442 A | * | 11/1984 | Kohl et al. | ............... 428/411.1 |
| 5,110,765 A | * | 5/1992 | Bilakanti et al. | ........... 438/500 |
| 5,468,343 A | * | 11/1995 | Kitano | ....................... 438/745 |
| 6,426,020 B1 | * | 7/2002 | Okada et al. | ............... 252/79.1 |
| 6,909,339 B2 | * | 6/2005 | Yonekura et al. | ........... 333/134 |
| 6,977,182 B2 | * | 12/2005 | Sato et al. | ...................... 438/5 |

OTHER PUBLICATIONS

Torimoto, "Fabrication of novel core-shell nanostructured materials using the size-selective photoetching technique", Jul. 15, 2003.*
Gerald et al, "Photodissolution of n-GaAs electrodes under laser illumination: control of the etching profile", Jan. 2001.*
Torimoto, Tsukasa et al., "Characteristic Features of Size-Selective Photoetching of CdS Nanoparticles as a Means of Preparation of Monodisperse Particles", J. Electrochem. Soc., vol. 145, No. 6, Jun. 1998, pp. 1964-1968.
Spanhel, Lubomir et al., "Photochemistry of Colloidal Semiconductors. 20. Surface Modification and Stability of Strong Luminescing CdS Particles", American Chemical Society, 1987, pp. 5649-5655.

* cited by examiner

*Primary Examiner*—H. Thi Le
(74) *Attorney, Agent, or Firm*—Reed Smith LLP; Stanley P. Fisher, Esq.; Juan Carlos A. Marquez, Esq.

(57) ABSTRACT

Monodisperse nanoparticles are prepared with a high degree of reproducibility by controlling pH in size-selective photoetching. The nanoparticles have uniform optical properties and other properties.

9 Claims, 2 Drawing Sheets

PRIOR ART

MONODISPERSE NANOPARTICLES PRODUCED BY SIZE-SELECTIVE PHOTOETCHING REACTION

FIELD OF THE INVENTION

The present invention relates to production of semiconductor nanoparticles and other nanoparticles. More specifically, it relates to a method for producing nanoparticles having uniform particle sizes with a high degree of reproducibility and to monodisperse nanoparticles produced by the method.

BACKGROUND OF THE INVENTION

Semiconductor nanoparticles have drawn attention since they emit strong fluorescence with a narrow full width at half maximum (FWHM). Thus, various fluorescent colors can be created, and their future applications can be nearly infinite.

Semiconductor nanoparticles having particle sizes of 10 nm or less are located in the transition region between bulk semiconductor crystals and molecules. Their physicochemical properties are therefore different from both bulk semiconductor crystals and molecules. In this region, the degeneration of the energy band that is observed in bulk semiconductors is removed and the orbits are dispersed. Due to this quantum-size effect, the energy gap of semiconductor nanoparticles increases or decreases as their particle sizes decrease or increase, respectively. The varying energy gap affects the fluorescent properties of the nanoparticles. More specifically, nanoparticles having small particle sizes and a large energy gap emit fluorescence at shorter wavelengths, and in contrast, those having large particle sizes and a small energy gap emit fluorescence at longer wavelengths. Accordingly, particle size control of semiconductor nanoparticles enables the development of various materials which emit fluorescence with a desired color.

To use semiconductor nanoparticles as fluorescent materials, their particle sizes must be controlled. Control of particle-size distribution to yield monodisperse nanoparticles enables semiconductor nanoparticles which have suitable fluorescent properties and exhibit spectrum with a narrow full width at half maximum.

Methods for producing semiconductor nanoparticles basically comprise the steps of preparing nanoparticles and narrowing their particle-size distribution to yield monodisperse nanoparticles. Semiconductor nanoparticles can be easily prepared by dissolving equimolar amounts of precursors of Cd and X, wherein X is S, Se or Te. This is also true for the production of, for example, CdSe, ZnS, ZnSe, HgS, HgSe, PbS or PbSe. The semiconductor nanoparticles prepared by the above method exhibit a wide distribution of particle size. Attempts have been made to attain a monodisperse distribution by using chemical techniques to precisely separate and extract only the semiconductor nanoparticles of a specific particle size from semiconductor nanoparticles having a wide distribution of particle sizes immediately after preparation. The attempts to attain a monodispersed distribution of particle sizes that have been reported so far include: separation by electrophoresis that utilizes variation in the surface charge of nanoparticles depending on their particle sizes; exclusion chromatography that utilizes differences in retention time due to different particle sizes; and size-selective precipitation that utilizes differences in dispersibility in an organic solvent due to differences in particle sizes.

The aforementioned production methods are carried out by preparing semiconductor nanoparticles having a wide distribution of particle sizes and then regulating and selecting the particles sizes. In contrast, methods in which preparation of nanoparticles and regulation of particle size to attain a monodisperse distribution are performed in one step have been reported. An example of these methods is the reversed micelle method. In this method, amphiphilic molecules such as sodium diisooctyl sulfosuccinate and water are dispersed in an organic solvent such as heptane, reversed micelles are formed in the organic solvent, and precursors are reacted in the aqueous phase alone in the reversed micelles. The inside of the reversed micelle is regarded as a reaction field, and the size of the reaction field is regulated by controlling the quantitative ratio of the amphiphilic molecules to water, thereby sorting nanoparticles into uniform particle sizes. The sizes of the resulting semiconductor nanoparticles depend on the sizes of reversed micelles and semiconductor nanoparticles having a relatively narrow distribution of particles sizes can be produced. Separately, a method for preparing nanoparticles and regulating particle sizes to attain a monodisperse distribution in one step with the use of Ostwald ripening has been reported. This method, however, requires preparation of a highly toxic reagent at high temperatures and thus exhibits insufficient safety.

Another possible solution than the above methods is size-selective photoetching utilizing photocatalytic reactions. The method utilizes the oxidative dissolution of a metal chalcogenide semiconductor in the presence of dissolved oxygen when irradiated with light to thereby yield monodisperse nanoparticles. For examples, upon photoexcitation of CdS nanoparticles in the presence of dissolved oxygen, excited electrons progress reduction of oxygen, and holes progress oxidation of the CdS nanoparticles. These photocatalytic reactions proceed during excitation of semiconductor nanoparticles. Dissolution of all the excited semiconductor nanoparticles terminates at a particle size having an energy gap corresponding to the energy of irradiated light at the shortest wavelength. More specifically, in size-selective photoetching, semiconductor nanoparticles having a wide distribution of particle sizes are irradiated with light at a shorter wavelength than the wavelength of their absorption edge to thereby selectively dissolve and optically pump semiconductor nanoparticles having large particle sizes. The resulting semiconductor nanoparticles have smaller and more uniform particle sizes. By selecting the wavelength of irradiated light, monodisperse nanoparticles having an arbitrary particle size can be prepared at room temperature with relatively high safety. In addition, the use of monochromatic light yields nanoparticles having a narrower and finely adjusted particle-size distribution. Preparation of monodisperse semiconductor nanoparticles by size-selective photoetching is described typically in J. Electrochem. Soc. 145: 1964(1998); and J. Pys. Chem. B. 105:6838(2001). The semiconductor nanoparticles exhibit deviations in terms of root-mean-square (rms) of 15% or more of the average particle size before light irradiation. When they are irradiated with light at a wavelength of 476.5 nm, these semiconductor nanoparticles exhibit a very narrow distribution of particle sizes, i.e., the deviation in terms of rms is approximately 6% of the average particle size. This indicates that the distribution of particle sizes is very close to the monodispersed state.

In the conventional size-selective photoetching methods as described in the above literature, monodisperse semiconductor nanoparticles are prepared in the following manner.

Initially, an aqueous solution (1000 ml) of sodium hexametaphosphate (0.1 mmol) and cadmium perchlorate (0.2 mmol) is prepared and is adjusted to pH 10.3. Hydrogen sulfide gas (0.2 mmol) is then injected into the solution while vigorously stirring by bubbling with nitrogen gas, followed by stirring for a while. The solution changes its color from optically transparent colorless to optically transparent yellow in this procedure. The resulting semiconductor nanoparticles having a wide particle-size distribution and being stabilized by hexametaphosphoric acid are then subjected to size-selective photoetching to thereby have a monodisperse distribution. Initially, the solution of the semiconductor nanoparticles is bubbled with nitrogen gas, followed by bubbling with oxygen gas for 10 minutes. Methylbiologen (50 μmol/l) is then added to the solution, and light is applied to the solution while stirring.

However, the present inventors have found that such semiconductor nanoparticles having a monodisperse particle-size distribution prepared by size-selective photoetching show large variation in their properties. The variations occur typically in surface modification of the semiconductor nanoparticles. Surface modification of semiconductor nanoparticles will be briefly illustrated below.

The semiconductor nanoparticles emit band gap fluorescence derived from inside the semiconductor nanoparticles, as well as another fluorescence which may be derived from an energy level in the energy band inside the semiconductor nanoparticles. The energy level for emitting the latter fluorescence is speculated to be present predominantly in the surface sites of the semiconductor nanoparticles. Control of particle sizes of the semiconductor nanoparticles affects the properties of the band gap fluorescence. The presence of the other fluorescence will deteriorate the properties of such semiconductor nanoparticles having a narrow particle-size distribution and should be avoided. The fluorescence in question can be prevented by modifying the surfaces of the semiconductor nanoparticles to thereby eliminate the energy level derived from the surfaces. Thus, the semiconductor nanoparticles become to emit band gap fluorescence derived from inside thereof alone. For surface modification, attempts have been made to cover the core semiconductor material particles with a semiconductor material, inorganic material or organic material having a band gap larger than the semiconductor material to thereby reduce the fluorescence. The present inventors filed a Japanese patent application on a method for modifying the surfaces of semiconductor nanoparticles by applying electron donating groups to the surfaces.

When semiconductor nanoparticles prepared by size-selective photoetching are subjected to surface modification, the nanoparticles show largely varying fluorescent properties depending on the properties of particles before surface modification. Specifically, the properties of prepared nanoparticles must be uniformized to yield semiconductor nanoparticles having fluorescent properties with a high degree of reproducibility.

SUMMARY OF THE INVENTION

Accordingly, an object of the present invention is to reduce variations in properties of monodisperse nanoparticles prepared by size-selective photoetching.

After intensive investigations, the present inventors have found that pH in size-selective photoetching significantly affects the properties of the prepared nanoparticles, and that optimum pH in a series of reactions in the case of CdS is within a range of 6 to 8.

In the conventional methods, pH largely varies upon introduction of $H_2S$ gas and in progress of the size-selective photoetching reaction. More specifically, in repetitive tests, pH significantly varies within a wide range of 6 to 9 after introduction of $H_2S$ gas, in a range of 5 to 9 in the photoetching reaction and in a range of 3 to 5 after the addition of thiol.

To suppress such pH variations, the present inventors have attempted to control pH in production of semiconductor nanoparticles by using a phosphate buffer solution and/or a pH-stat. As a result, they found that a series of reactions can proceed within a relatively narrow range of pH of 7 to 8 and the resulting semiconductor nanoparticles have properties with a very high degree of reproducibility.

Specifically, the present invention provides, in a first aspect, a method for producing nanoparticles through size-selective photoetching, including the step of controlling pH in size-selective photoetching.

The pH is preferably controlled by using a buffer solution or a pH-stat.

The nanoparticles are preferably semiconductor nanoparticles. However, the present invention can also be applied to other nanoparticles to which size-selective photoetching is applicable, such as nanoparticles of Ag, Au and other metals, and nanoparticles of single-crystal carbon (diamond).

The present invention further provides, in a second aspect, monodisperse nanoparticles which have been produced by the method of the present invention and have uniform optical properties.

The nanoparticles widely include nanoparticles to which size-selective photoetching is applicable. Examples of nanoparticles are nanoparticles of semiconductor materials selected from ZnO, ZnS, ZnSe, ZnTe, CdO, CdS, CdMnS, CdSe, CdMnSe, CdTe, CdMnTe, HgS, HgSe, HgTe, InP, InAs, InSb, InN, GaN, GaP, GaAs, GaSb, $TiO_2$, $WO_3$, PbS, PbSe, MgTe, AlAs, AlP, AlSb, AlS, Ge, Si, CdZnS, CdZnSe, CdZnTe, PbTe, $Cd_3P_2$, $Cd_3As_2$, $Zn_3P_2$, $Zn_3As_2$, $In_2S_3$, $CuIn_2$, $In_2Se_3$, $CuInSe_2$, $In_2O_3$, MgTe, AlAs, AlP, AlSb and AlS; nanoparticles of carbon materials such as diamond; and nanoparticles of metal materials such as Ag and Au.

The present invention can significantly reduce batch-to-batch variations in optical properties of semiconductor nanoparticles prepared by size-selective photoetching. Namely, the method of the present invention can produce monodispersed semiconductor nanoparticles with a high degree of reproducibility utilizing size-selective photoetching.

Further objects, features and advantages of the present invention will become apparent from the following description of the preferred embodiments with reference to the attached drawings.

DETAILED DESCRIPTION OF THE INVENTION

Figure 1:
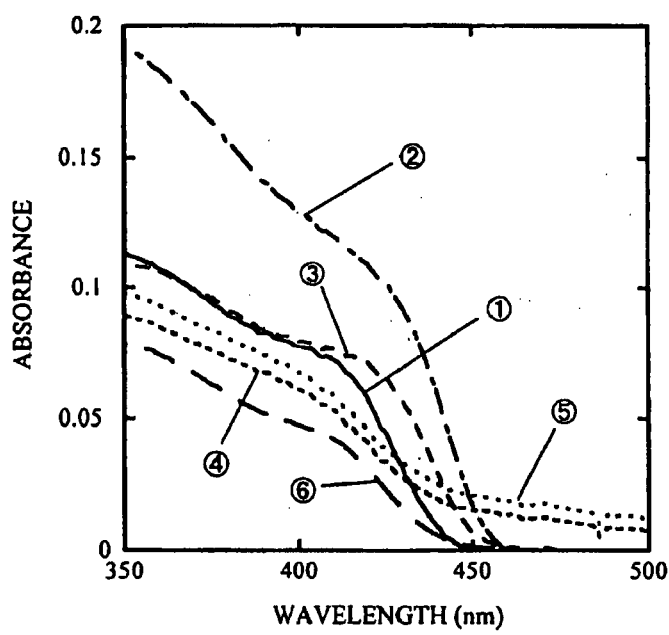
FIGS. 1 and 2 are absorption spectra and fluorescence spectra, respectively, of CdS nanoparticles prepared by the conventional method.

The "buffer solution" as used herein means a solution having sufficient buffering activity on a varying hydrogen ion exponent (pH) in the solution. For example, a solution of a mixture of a weak acid such as acetic acid with its conjugate base works to suppress its pH change even when a small amount of H⁺ or OH⁻ is added thereto. Likewise, a system containing a weak base and its conjugate acid works in the same manner. Examples of the pH buffer solution include (1) solutions each containing a stoichiometric amount of a strong acid with a solution of a weak base such as glycine (adjustable pH: 1.0 to 4.7), monopotassium phthalate (adjustable pH: 2.2 to 3.8) or tris(hydroxymethyl)aminomethane (adjustable pH: 7 to 9); (2) solutions each containing a stoichiometric amount of a dilute solution of a strong base with a solution of a weak acid such as succinic acid (adjustable pH: 3.8 to 6.0), monopotassium citrate (adjustable pH: 2.1 to 6.0), boric acid or phosphoric acid; (3) solutions each containing a stoichiometric amount of an equimolar solution of a conjugate acid-base such as acetic acid-sodium acetate (adjustable pH: 3.4 to 6) in combination with a stoichiometric amount of another equimolar solution of a conjugate acid-base to thereby control pH within a wide range. Each of such buffer solutions can be used alone or in combination according to the target pH.

The "pH-stat" is an automatic device for maintaining pH of a solution over a long period of time and works to maintain pH at a predetermined level when pH of the solution will vary due to chemical change or external influence. For example, the device works to determine pH of the solution with a glass electrode pH meter, and when the measured pH is different from the predetermined pH, to operate an automatic control mechanism to drive a buret containing an acid or base solution to thereby change pH to the predetermined pH.

Production of semiconductor nanoparticles using size-selective photoetching according to the present invention will be illustrated below.

Semiconductor nanoparticles have a very large ratio of their surface areas to their volumes and are very susceptible to aggregation. To stabilize the semiconductor nanoparticles, collision and aggregation of particles must be avoided. For this purpose, various procedures have been proposed. Such procedures can be roughly classified as those based on physical separation of semiconductor nanoparticles from one another in which the semiconductor nanoparticles are included into a solid or polymer matrix, and as those based on inactivation of particle surfaces by chemically modifying the metal ion sites of the particle surfaces with a low-molecular-weight organic substance capable of coordinating therewith. In the present invention, hexametaphosphoric acid is used as a stabilizer based on the latter mechanism.

Production of Monodisperse Semiconductor Nanoparticles

Initially, 1000 ml of aqueous solution of sodium hexametaphosphate (0.1 mmol) and cadmium perchlorate (0.2 mmol) was prepared. Then, disodium hydrogen phosphate (1.0 mmol) was added for pH control. Hydrogen sulfide gas (0.2 mmol) was then injected into the solution while vigorously stirring by bubbling with nitrogen gas, followed by stirring for a while. The solution changed its color from optically transparent colorless to optically transparent yellow in this procedure.

In this procedure, semiconductor nanoparticles (CdS) stabilized by hexametaphosphoric acid were formed in the solution. They had a wide particle-size distribution and a deviation in terms of rms reaching 15% or more of the average particle size.

The resulting semiconductor nanoparticles were then subjected to size-selective photoetching to have a monodisperse distribution. Initially, the solution of the semiconductor nanoparticles was bubbled with nitrogen gas, followed by bubbling with oxygen gas for 10 minutes. Methylbiologen (50 μmol/l) was then added to the solution, and light was applied to the solution while stirring. In this example, the solution was irradiated with monochromatic light derived from argon ion laser at 457.8 nm. Thus, a series of reactions from preparation of nanoparticles to conversion into a monodisperse distribution could be performed at optimum pH in a range from 7 to 8.

By modifying the surface of the monodispersed semiconductor nanoparticles in the solution, they become to emit band gap fluorescence with spectrum having a narrow full width at half width corresponding to the irradiated monochromatic light and the particles sizes of the semiconductor nanoparticles. The surfaces of the semiconductor nanoparticles were modified in the following manner.

Surface Modification of Semiconductor Nanoparticles

Figure 2:
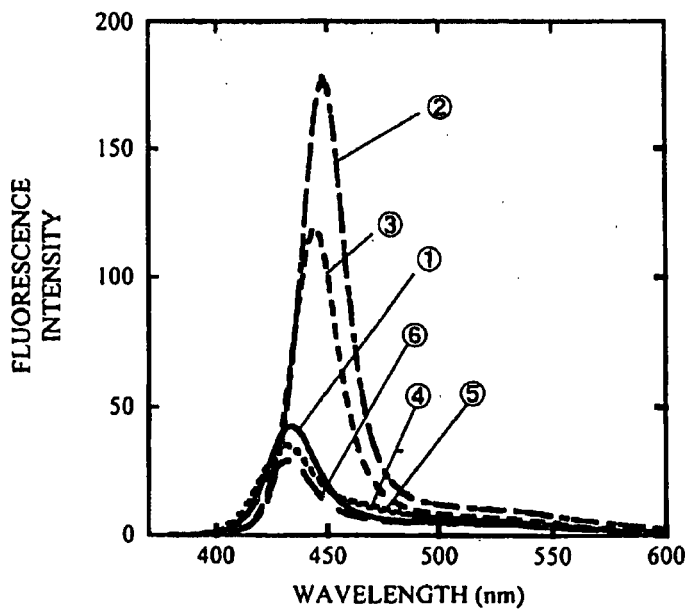

The surfaces of the above-prepared monodisperse semiconductor nanoparticles stabilized by hexametaphosphoric acid were modified by adding 50 μl of mercaptopropionic acid (MPA) to the solution and stirring the mixture for several hours. The resulting solution was then subjected to ultrafiltration to remove impurities such as methylbiologen, hexametaphosphoric acid, unreacted thiol compound and ions dissolved upon photoetching. Thus, a pure solution of semiconductor nanoparticles modified with and stabilized by the thiol compound was yielded. The semiconductor nanoparticles were further subjected to repetitive flow cleaning and the entire liquid component was eliminated. An aqueous solution of 0.1 M $NH_3$—HCl pH 11 was added to the nanoparticles to an absorbance of 0.5, and the mixture was left for several days to several weeks and thereby yielded an optically transparent yellow solution of semiconductor nanoparticles having excellent optical properties. FIGS. 1 and 2 illustrate the changes with time of the absorbance and of the fluorescence intensity in the above production method.

Optical Properties of Semiconductor Nanoparticles

As described above, the properties of semiconductor nanoparticles prepared by size-selective photoetching significantly affect the fluorescent properties of nanoparticles after surface modification. The properties of nanoparticles before surface modification will be described in detail below.

FIGS. 1 and 2 are the absorption spectra and fluorescence spectra 40 days into surface modification with ammonia of semiconductor nanoparticles prepared by a conventional method utilizing size-selective photoetching. Table 1 shows pH changes of the CdS nanoparticles solution during size-selective photoetching corresponding to spectra 1 through 6 in these figures.

TABLE 1

| Spectrum number | pH variation during photoetching |
|---|---|
| 1 | 9.06-8.18 |
| 2 | 8.28-7.51 |
| 3 | 8.27-6.64 |
| 4 | 8.01-6.69 |
| 5 | 7.66-6.30 |
| 6 | 7.00-5.60 |

Figure 3:
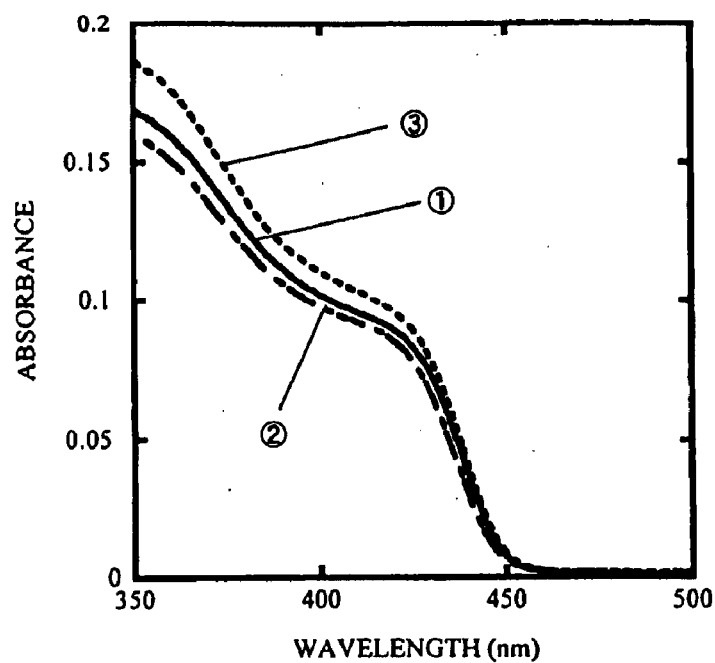
FIGS. 3 and 4 are absorption spectra and fluorescence spectra, respectively, of CdS nanoparticles prepared by the method of the present invention.
Figure 4:
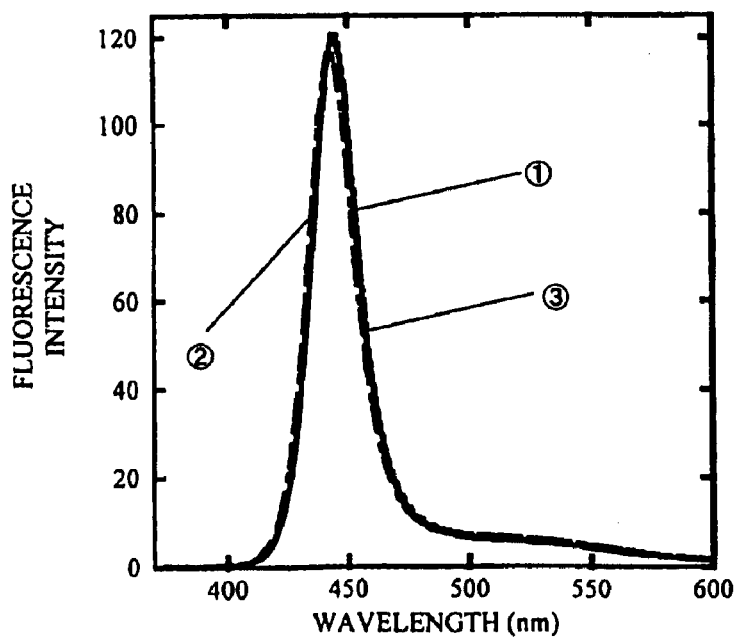

FIGS. 3 and 4 are the absorption spectra and fluorescence spectra 21 days into surface modification with ammonia of CdS semiconductor nanoparticles prepared by the method of the present invention through size-selective photoetching using a buffer solution. Table 2 shows pH changes of the CdS nanoparticles solution during size-selective photoetching corresponding to spectra 1 through 3 in these figures.

TABLE 2

| Spectrum number | pH variation during photoetching |
|---|---|
| 1 | 7.27-7.21 |
| 2 | 7.23-7.19 |
| 3 | 7.23-7.19 |

The conventional method and the method of the present invention will be compared. The conventional method shows large batch-to-batch and intra-batch variations in pH in photoetching. In contrast, the method of the present invention shows little batch-to-batch and intra-batch variations in photoetching, indicating that pH as a parameter that affects the properties can be controlled within an optimum range according to the present invention. Regarding the absorption spectra and fluorescence spectra after surface modification, the conventional method shows a large batch-to-batch variation, but the method of the present invention shows little batch-to-batch variation. These results show that pH control according to the present invention enables production of monodisperse semiconductor nanoparticles with a high degree of reproducibility using size-selective photoetching.

In the above example, CdS nanoparticles were used as the nanoparticles, and pH was adjusted within a range of 7 to 8. However, upon the use of other nanoparticles, the pH can be set within an optimum range. Specifically, the buffer solution for use in the present invention is not specifically limited and can be selected according to the optimum pH range under reaction conditions such as material for the nanoparticles.

Control of pH can be performed by any means or device including a buffer solution and a pH stat and other mechanical procedures.

The material for the semiconductor nanoparticles is not specifically limited and includes, for example, ZnO, ZnS, ZnSe, ZnTe, CdO, CdS, CdMnS, CdSe, CdMnSe, CdTe, CdMnTe, HgS, HgSe, HgTe, InP, InAs, InSb, InN, GaN, GaP, GaAs, GaSb, $TiO_2$, $WO_3$, PbS, PbSe, MgTe, AlAs, AlP, AlSb, AlS, Ge, and Si.

The present invention is effective not only in size-selective photoetching of semiconductor nanoparticles but also in that of other nanoparticles to which size-selective photoetching can be applied. Examples of the other nanoparticles are nanoparticles of Ag, Au and other metals, and nanoparticles of single-crystal carbon (diamond).

The present invention is also effective for methods utilizing size-selective photoetching described in, for example, Japanese Patent Applications No. 2002-87768, No. 2002-168109, No. 2002-213599, No. 2002-240848, No. 2002-254628 and No. 2003-63131 of the present inventors.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for producing monodisperse semiconductor nanoparticles dispersed in liquid, comprising:
    a step of providing semiconductor nanoparticles of a wide particle-size distribution dispersed in liquid; and
    a step of subjecting said semiconductor nanoparticles of said wide particle-size distribution dispersed in liquid to a size-selective photoetching reaction while controlling a pH variation of said liquid dispersed with said semiconductor nanoparticles of said wide particle-size distribution to be less than 0.77 during the size-selective photoetching reaction.

2. The method according to claim 1, wherein a buffer solution is added to said liquid dispersed with said semiconductor nanoparticles of said wide particle-size distribution so as to control said pH variation.

3. The method according to claim 2, wherein the buffer solution is a mixture of a weak acid with a conjugate base thereof to suppress the pH variation of said liquid dispersed with said semiconductor nanoparticles of said wide particle-size distribution caused by at least the size-selective photoetching reaction.

4. The method according to claim 3, wherein the weak acid is acetic acid.

5. The method according to claim 1, wherein a pH-stat device is used to monitor a pH of said liquid dispersed with said semiconductor nanoparticles of said wide particle-size distribution so as to control said pH variation by adding acid or alkali into said liquid.

6. The method according to claim 1, wherein the semiconductor nanoparticles are CdS nanoparticles, and wherein a pH value of the solution in photoetching is controlled within a range from 6 to 8.

7. The method according to claim 1, wherein the pH variation of the solution which contains said semiconductor nanoparticles is controlled to be 0.06 during size-selective photoetching.

8. The method according to claim 1, wherein the pH variation of the solution which contains said semiconductor nanoparticles is controlled to be 0.04 during size-selective photoetching.

9. The method according to claim 1, wherein the size-selective photoetching reaction involves irradiating said semiconductor nanoparticles of said wide particle-size distribution dispersed in liquid with a monochromatic light thereby dissoluting excited semiconductor nanoparticles.

* * * * *